US011704846B2

United States Patent
Lv et al.

(10) Patent No.: US 11,704,846 B2
(45) Date of Patent: *Jul. 18, 2023

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventors: Yang Lv, Shanghai (CN); Yu Ding, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 94 days.

This patent is subject to a terminal disclaimer.

(21) Appl. No.: 17/341,362

(22) Filed: Jun. 7, 2021

(65) Prior Publication Data

US 2021/0304459 A1 Sep. 30, 2021

Related U.S. Application Data

(63) Continuation of application No. 16/241,030, filed on Jan. 7, 2019, now Pat. No. 11,049,292, which is a
(Continued)

(51) Int. Cl.
*G06T 11/00* (2006.01)
*G06T 1/20* (2006.01)
(Continued)

(52) U.S. Cl.
CPC ............. *G06T 11/005* (2013.01); *G06T 1/20* (2013.01); *G06T 5/001* (2013.01); *G06T 7/10* (2017.01);
(Continued)

(58) Field of Classification Search
CPC .. G06T 1/20; G06T 5/001; G06T 7/10; G06T 11/005; G06T 11/006; G06T 11/008;
(Continued)

(56) References Cited

U.S. PATENT DOCUMENTS

| 5,744,802 A | 4/1998 | Muehllehner et al. |
| 2004/0087853 A1 | 5/2004 | Fujisawa |

(Continued)

FOREIGN PATENT DOCUMENTS

| CN | 103908278 A | 7/2014 |
| CN | 104183012 A | 12/2014 |

(Continued)

OTHER PUBLICATIONS

Ha et al. "GPU-accelerated forward and back-projections with spatially varying kernels for 3D Direct TOF PET reconstruction." IEEE transactions on nuclear science 60.1 (2013): 166-173. (Year: 2013).*

(Continued)

*Primary Examiner* — Katrina R Fujita
(74) *Attorney, Agent, or Firm* — Metis IP LLC

(57) ABSTRACT

The disclosure relates to a system and method for image reconstruction. The method may include the steps of: obtaining raw data corresponding to radiation rays within a volume, determining a radiation ray passing a plurality of voxels, grouping the voxels into a plurality of subsets such that at least some subset of voxels are sequentially loaded into a memory, and performing a calculation relating to the sequentially loaded voxels. The radiation ray may be determined based on the raw data. The calculation may be performed by a plurality of processing threads in a parallel hardware architecture. A processing thread may correspond to a subset of voxels.

20 Claims, 9 Drawing Sheets

Related U.S. Application Data continuation of application No. 15/318,212, filed as application No. PCT/CN2016/079721 on Apr. 20, 2016, now Pat. No. 10,176,604.

(51) Int. Cl.
G06T 5/00 (2006.01)
G06T 7/10 (2017.01)

(52) U.S. Cl.
CPC ........ *G06T 11/006* (2013.01); *G06T 2210/41* (2013.01); *G06T 2211/424* (2013.01); *G06T 2211/428* (2013.01)

(58) Field of Classification Search
CPC ....... G06T 2207/10104; G06T 2210/41; G06T 2211/416; G06T 2211/424; G06T 2211/428
See application file for complete search history.

(56) References Cited

U.S. PATENT DOCUMENTS

| | | | |
|---|---|---|---|
| 2007/0080295 A1* | 4/2007 | Hamill | A61B 6/037 250/363.03 |
| 2010/0054567 A1 | 3/2010 | Hillebrand et al. | |
| 2011/0182491 A1 | 7/2011 | Levin et al. | |
| 2012/0126125 A1 | 5/2012 | Akazawa et al. | |
| 2014/0366504 A1 | 12/2014 | Chen et al. | |
| 2015/0022521 A1 | 1/2015 | Loop | |
| 2015/0213630 A1 | 7/2015 | Szirmay-Kalos et al. | |
| 2018/0154177 A1 | 6/2018 | Bzdusek et al. | |
| 2018/0165839 A1 | 6/2018 | Lv et al. | |
| 2020/0160597 A1 | 5/2020 | Chen et al. | |

FOREIGN PATENT DOCUMENTS

| | | |
|---|---|---|
| CN | 104700438 A | 6/2015 |
| CN | 104751499 A | 7/2015 |
| CN | 105078495 A | 11/2015 |
| CN | 105147312 A | 12/2015 |
| CN | 106491151 A | 3/2017 |

OTHER PUBLICATIONS

International Search Report in PCT/CN2016/070721 dated Feb. 6, 2017, 4 pages.
Written Opinion in PCT/CN2016/079721 dated Feb. 6, 2017, 4 pages.
Kyung Sang Kim et al., Fully 3D Iterative Scatter-Corrected OSEM for HRRT PET using a GPU, Physics in Medicine and Biology, 56: 4991-5009, 2011.
Jing-Yu Cui et al., Fully 3D List-mode Time-of-flight PET Image Reconstruction on GPUs using CUDA, Medical Physics, 36(12): 6775-6786, 2011.
Robert L. Siddon, Fast Calculation of the Exact Radiological Path for a Three-dimensional CT Array, Medical Physics, 12(2): 252-255, 1985.
Examination report in British Application No. 1710485.2 dated Jun. 27, 2018, 5 pages.
The Extended European Search Report in European Application No. 16815525.7 dated Nov. 2, 2018, 8 pages.
Cheng-Ying Chou et al., A Fast Forward Projection using Multithreads for Multirays on GPUs in Medical Image Reconstruction, Medical Physics, 38(7): 4052-4065, 2011.
Marcel Beister et al., Lterative Reconstruction Methods in X-ray CT, Physica Medica, 28(2): 94-108, 2012.
Yusuke Okitsu et al., High-performance Cone Beam Reconstruction using CUDA Compatible GPUs, Parallel Computing, 36: 129-141, 2010.
Fang Xu et al., On the Efficiency of Iterative Ordered Subset Reconstruction Algorithms for Acceleration on GPUs, Computer Methods and Programs in Biomedicine 98: 261-270, 2010.
First Office Action in Chinese Application No. 201680006842.5 dated Mar. 12, 2020, 21 pages.
"Thread Block (CUDA Programming)", Web page<https://en.wikipedia.org/wiki/Thread_block>, Sep. 23, 2020.
Summons to Attend Oral Proceedings Pursuant to Rule 115(1) EPC in European Application No. 16815525.7 mailed on Oct. 12, 2020, 4 pages.

\* cited by examiner

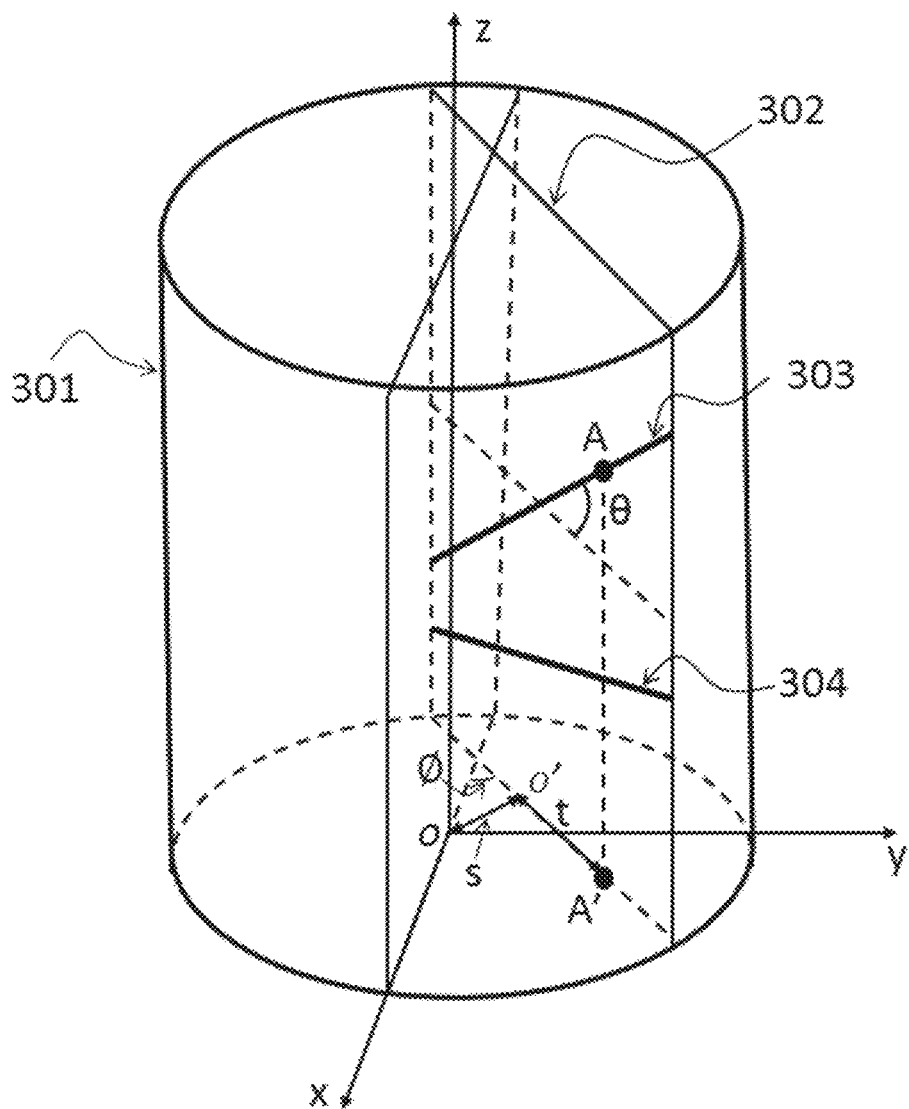
FIG. 3-A

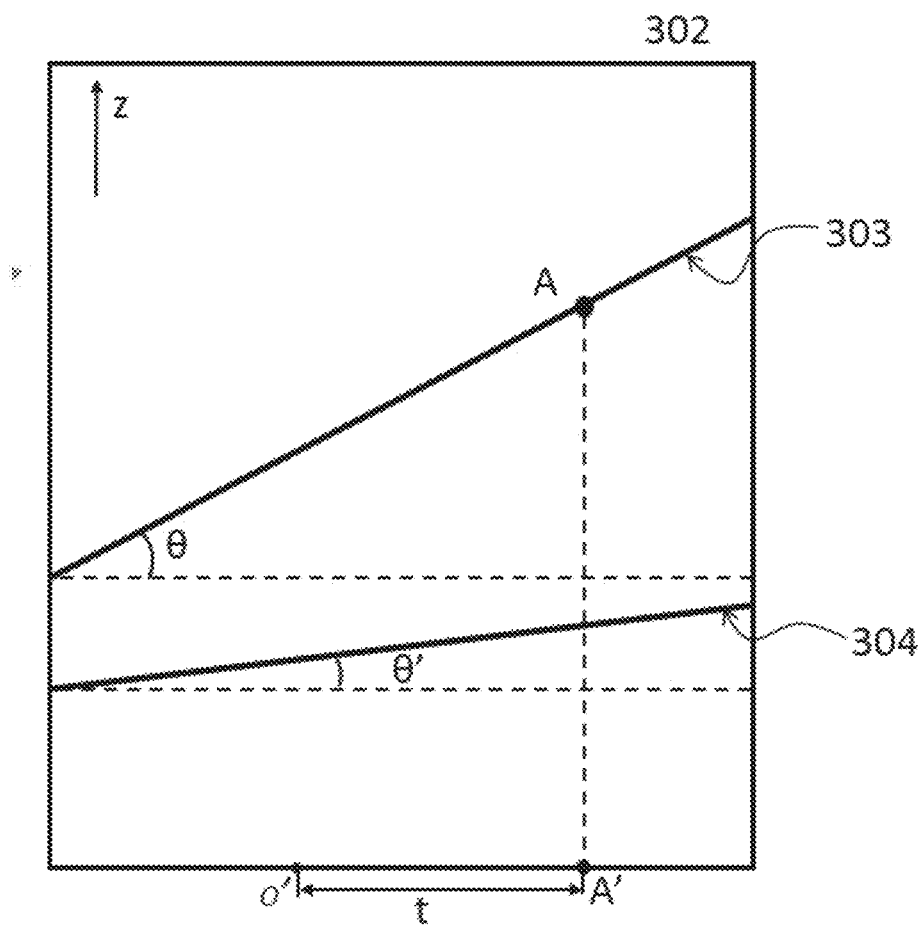
FIG. 3-B

SYSTEM AND METHOD FOR IMAGE RECONSTRUCTION

CROSS-REFERENCE TO RELATED APPLICATIONS

This application is a continuation of U.S. patent application Ser. No. 16/241,030, filed on Jan. 7, 2019, which is a continuation of U.S. patent application Ser. No. 15/318,212 (issued as U.S. Pat. No. 10,176,604), filed on Dec. 12, 2016, which is a U.S. national stage under 35 U.S.C. § 371 of International Application No. PCT/CN2016/079721, filed on Apr. 20, 2016, designating the United States of America, the contents of each of which are hereby incorporated by reference.

TECHNICAL FIELD

This present disclosure relates to image processing, and more particularly, relates to a system and method for data processing in image reconstruction.

BACKGROUND

Positron emission tomography (PET) has been widely used in medicine for diagnosis and other purposes. An object, such as a patient, may be scanned with a PET system to obtain PET datasets. For reconstruction of PET images from PET datasets, various reconstruction methods have been developed. These methods may roughly be characterized into two classes: analytical methods and iterative methods.

During the reconstruction of PET images, both the forward and back projection process may take a large amount of calculation. The reconstruction by way of an iterative method may be more time-consuming because it involves multiple forward and back projection operations. In recent years, research has been conducted on parallelization of forward projection operations and back projection operations, as parallel calculations of an iterative approximation using a GPU.

Such methods may involve the usage of a shared memory or a texture memory. The shared memory or texture memory may store an image matrix, and the image matrix may be accessed by the GPU with a relatively short latency. The memory space of the shared memory or the texture memory may be relatively small, generally ranging from several kilobytes to several megabytes. However, practically, the image matrix may need more memory space due to the higher spatial resolution of the PET system and/or an increased dimension of a PET scanner. Thus, the memory space of a shared memory or a texture memory may be insufficient for processing the image matrix acquired in such a PET scanner. There is thus a need for addressing these and/or other issues.

SUMMARY

Some embodiments of the present disclosure relates to a method for generating an image. The method may include one or more of the following operations. Raw data corresponding to radiation rays within a volume may be obtained. The volume may include different sections of radiation rays. Sections of radiation rays may be determined based on parameters including, for example, the radial distance, the tilting angle, the rotation angle, or the like, or a combination thereof. In some embodiments, such as in a PET system, the sections of radiation rays may be determined based on the position of the point of annihilation on a LOR. A first radiation ray, among the radiation rays, passing a plurality of voxels corresponding to the volume based on the raw data may be determined. The voxels may be grouped into a plurality of subsets such that at least one subset of voxels are sequentially loaded into a memory. In some embodiments, the voxels passed by the radiation ray may be grouped into different subsets based on parameters such as, the radial distance, the tilting angle, the rotation angle, or the like, or a combination thereof. In some embodiments, such as in a PET system, the voxels passed by the radiation ray may also be grouped into a plurality of subsets based on the position of the point of annihilation on a LOR. One voxel subset may correspond to one or more voxels. Different subsets of voxels may be assigned to different threads. In some embodiments, the assignment of threads corresponding to voxels may relate to the interception of the voxels by the radiation ray. A calculation relating to the subsets of voxels by a plurality of processing threads in a parallel hardware architecture may be performed, one processing thread corresponding to a subset of voxels. The calculation of different subsets of voxels relating to a radiation ray may be processed by processing units (e.g., threads). Calculations performed by the threads may be performed in parallel or at least partially in parallel. In some embodiments, the parallel hardware architecture may include at least one graphic processing unit which may further include a plurality of scalar processors. The plurality of processing threads may have identical control paths. In some embodiments, the control path may be the distance that a signal travels from the graphic processing unit to the threads. In some embodiments, the calculation may be a forward projection. The forward projection may obtain measurement data by carrying out forward projection calculations based on particle emission data corresponding to the object. In some embodiments, the calculation may be a back projection. The back projection may obtain particle emission data by carrying out back projection calculations based on the measurement data. In some embodiments, the forward projection and back projection may be performed iteratively.

Some embodiments of the present disclosure relates to a system including a data acquisition module, a data processing machine, an analysis module, and a projection module. The system may reconstruct an image of a subject. When the data acquisition module in the system receives raw data corresponding to activity of particle emissions within a volume, the system may perform one or more of the following operations. A radiation ray passing a plurality of voxels corresponding to the volume may be determined based on the raw data. The voxels may be grouped into a plurality of subsets such that at least one subset of voxels are sequentially loaded into a memory. In some embodiments, the voxels passed by the radiation ray may be grouped into different subsets based on parameters including, for example, the radial distance, the tilting angle, the rotation angle, or the like, or a combination thereof. In some embodiments, in a PET system, the voxels that the radiation ray passes may also be grouped based on the position of the point of annihilation on a LOR. As used herein, the LOR is a specific representation of radiation ray in PET system, in some other imaging systems, the radiation ray may take the form of other lines relating to radiation. One subset may correspond to one or more voxels. A calculation relating to the subsets of voxels by a plurality of processing threads in a parallel hardware architecture may be performed, a processing thread of the plurality of processing threads corresponding to a subset of voxels. The calculation of different subsets of voxels relating to a radiation ray may be processed by processing units (e.g., threads). Calculations performed by the threads may be performed in parallel or at least partially in parallel. In some embodiments, the calculation may be a forward projection or a back projection.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3-A and FIG. 3-B illustrate the geometry of LORs according to some embodiments of the present disclosure;

DETAILED DESCRIPTION

Figure 1:
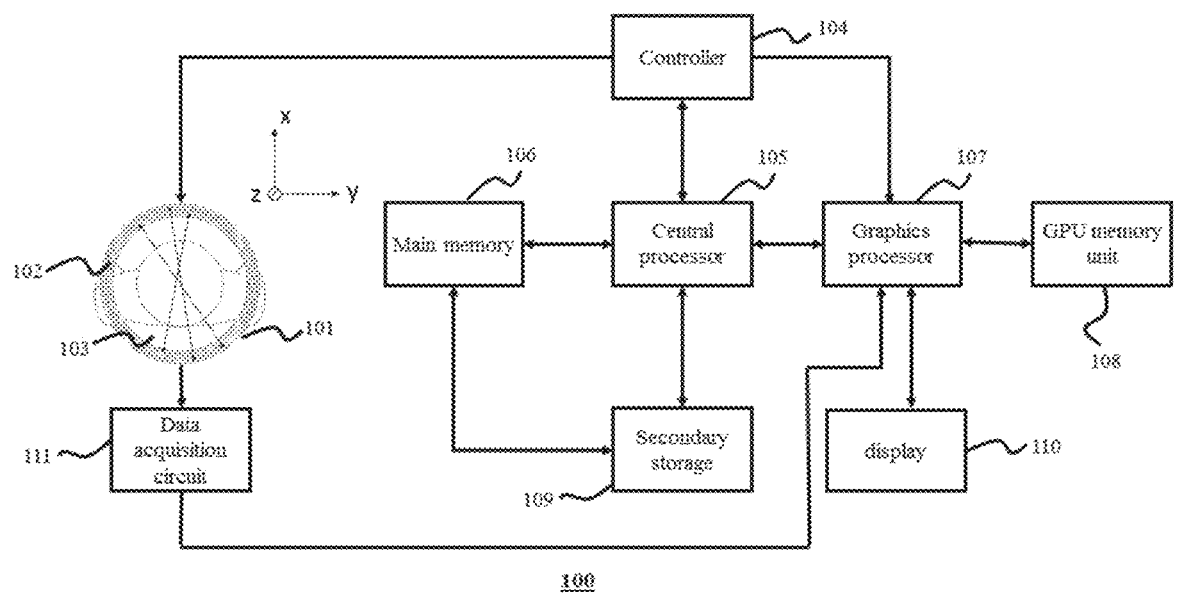
FIG. 1 is a block diagram of an imaging system 100 according to some embodiments of the present disclosure.

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "construction" and "reconstruction," when used in this disclosure, may represent a similar process in which an image may be transformed from data. Moreover, the phrase "image processing" and the phrase "image generation" may be used interchangeably. In some embodiments, image processing may include image generation.

The present disclosure provided herein relates to an image reconstruction system. Specifically, the method may be carried out in a parallel architecture of a processing unit. In some embodiments, the method may be detailed where the parallel hardware architecture is at least one Graphics Processing Unit (GPU). The system according to the disclosure may also be applied in other parallel architectures with modifications without departing from the principles. The method and system may be used in image reconstruction based on various image data acquired by ways of, for example, a positron emission tomography (PET) system, a single photon emission computed tomography (SPECT) system, a computed tomography (CT) system, a digital radiography (DR) system, a multi-modality system, a magnetic resonance imaging system, or the like, or a combination thereof.

FIG. 1 is a block diagram of an imaging system 100 according to some embodiments of the present disclosure. It should be noted that the imaging system 100 described below is merely provided for illustration purposes, and not intended to limit the scope of the present disclosure. The radiation used herein may include a particle ray, a photon ray, or the like, or any combination thereof. The particle ray may include neutron, proton, electron, μ-meson, heavy ion, or the like, or any combination thereof. The photon beam may include X-ray, γ-ray, α-ray, β-ray, ultraviolet, laser, or the like, or any combination thereof. The imaging system may find its applications in different fields such as, for example, medicine or industry. Merely by way of example, the imaging system may be a positron emission tomography (PET) system, a single photon emission computed tomography (SPECT) system, a computed tomography (CT) system, a digital radiography (DR) system, a multi-modality system, or the like, or any combination thereof. Exemplary multi-modality system may include a computed tomography-positron emission tomography (CT-PET) system, a computed tomography-magnetic resonance imaging (CT-MM) system, etc. As another example, the system may be used in internal inspection of components including, e.g., flaw detection, security scanning, failure analysis, metrology, assembly analysis, void analysis, wall thickness analysis, or the like, or any combination thereof.

As illustrated in FIG. 1, the imaging system 100 may include a gantry 101, a detector 102, a controller 104, a central processor 105, a main memory 106, a graphics processor 107, a GPU memory unit 108, a secondary storage 109, and a data acquisition circuit 111.

The gantry 101 may include an opening 103 that an object, for example, a patient, may be located for an examination. The patient may be scanned, for example, sequentially from the head to the abdomen and the feet, thereby obtaining images of the patient. The detector 102 may include a plurality of detector cells. The detector cells may be arranged in the form of a ring, a part of a ring or cylinder to surround the object being scanned. The detector 102 may be placed within the wall of the gantry 101. In some embodiments, the detector 102 may be a gamma ray detector. In some embodiments, the detector 102 may be an X-ray detector. Details regarding the detector 102 may be found in FIG. 2.

The imaging system 100 may further include a couch (not shown in FIG. 1) on which the object may be placed. The couch may be moved up and down. The couch may be moved parallel to the z axis into and out of the gantry 101. The movement of the couch may be controlled by the controller 104. In addition, the controller 104 may perform other components of the imaging system 100. The controller 104 may communicate with the central processor 105 for exchanging information relating to the operation of the scanner or other parts of the imaging system 100. Control logic (software) and data may be stored in the main memory 106 connected to the central processor 105. In some embodiments, the main memory may be a random access memory (RAM), a read only memory (ROM), etc. The secondary storage 109 may include, for example, a hard disk drive and/or a removable storage drive, representing a floppy disk drive, a magnetic tape drive, a compact disk drive, etc. The removable storage drive may read from and/or write data to a removable storage unit in a certain manner.

The controller 104 may also take control of the graphics processor 107. The graphics processor 107 may be a single processor, or a collection of multiprocessors. A multiprocessor may have several single instruction multiple data (SIMD) scalar processors that share the instruction unit and execute the same machine instruction. The graphics processor 107 may include a plurality of shader modules, a rasterization module, or the like, or a combination thereof. The various modules may be situated on a signal semiconductor platform to form a graphics processing unit (GPU). As used herein, a signal semiconductor platform may refer to a sole unitary semiconductor-based integrated circuit or chip. It should be noted that the term signal semiconductor platform may also refer to a multi-chip operation, and make substantial improvements over utilizing a conventional central processing unit (CPU) and bus implementation. In some embodiments, the various modules may be situated separately or collectively on semiconductor platforms.

The graphics processor 107 may access the GPU memory unit 108. The GPU memory unit 108 may take the form of a global memory, a shared memory, a register, or the like, or a combination thereof. Merely by way of example, the shared memory may be accessed by its respective parallel processors. The shared memory may include physically separate memories associated with each processor (e.g., included in the graphics processor 107). Alternatively, the shared memory may include separately allocated regions of one or more memories shared amongst the processors. As another example, the global memory may be accessible to one or more processors of, for example, the graphics processor 107. The global memory may be embodied on an integrated circuit that is separate from the integrated circuit on which the graphics processor 107 is embodied. The GPU memory unit 108 may be formed of storage media represented by a ROM, a RAM, etc. In some embodiments, data relating to the data acquisition circuit 111, and/or various data resulting from the processing by the graphics processor 107 may be written to and stored in the RAM, and/or may be read from the RAM as needed. The data acquisition circuit 111 may be used to detect radiation rays in the imaging system. Merely by way of example, the radiation rays may take the form of line of response (LOR) in a PET system. Detection of the LORs may be performed by the data acquisition circuit 111 by way of counting values of coincidence from annihilation of positrons. As another example, the radiation rays may be X-ray beams passing through an object (e.g., a patient) in a CT system. The intensity of an X-ray beam passing through the object that lies between the X-ray source and the detector 102 may be attenuated, and further evaluated by the data acquisition circuit 111. In some embodiments, the ROM may store programs for imaging of various types of nuclear medicine diagnosis. Exemplary types of nuclear medicine diagnosis may include PET, SPECT, CT, MM, or the like, or a combination thereof. For example, in order to cause a parallel computing architecture called CUDA provided by NVIDIA Corporation to perform parallel calculations using the Graphics processor 107, programs relating to CUDA may be stored in the ROM, and may be executed by the central processor 105 and/or the graphics processor 107 as needed. It should also be noted here that the "line of response" or "LOR" used here may be representative of a radiation ray, and not intended to limit the scope of the present disclosure. The radiation ray used herein may include a particle ray, a photon ray, or the like, or any combination thereof. The particle ray may include neutron, proton, electron, μ-meson, heavy ion, or the like, or any combination thereof. For example, the radiation ray may represent the intensity of an X-ray beam passing through the subject in the case of a CT system. As another example, the radiation ray may represent the probability of a positron generated in the case of a PET system.

The data acquisition circuit 111 may select data to be further processed from the original data. The data acquisition circuit 111 may measure the number of hits on the detector 102 and determine, for example, the line of response (LOR) in the case of PET, the projected X-rays that pass through a subject in the case of CT, etc. In some embodiments, the data acquisition circuit 111 may be a coincidence counting circuit in the case of PET. Specifically, when a patient takes a radioactive drug, two gamma rays may be generated by annihilation of a positron. For example, a coincidence counting circuit may check the incidence timing of the gamma rays, and determines the inputted event to be proper data when the gamma rays impinge on the detector 102 at opposite sides of the patient at or around the same time. The coincidence counting circuit may be part of the data acquisition circuit 111.

In some embodiments, the display 110 may display imaging results generated by, for example, the graphics processor 107. In some embodiments, the display 110 may display data stored in the GPU memory unit 108, in the main memory 106, and/or the secondary storage 109.

Further, while not shown, the imaging system 100 may be connected to a network (e.g., a telecommunications network, a local area network (LAN), a wireless network, a wide area network (WAN) such as the Internet, a peer-to-peer network, a cable network, etc.) for communication purposes.

Figure 2:
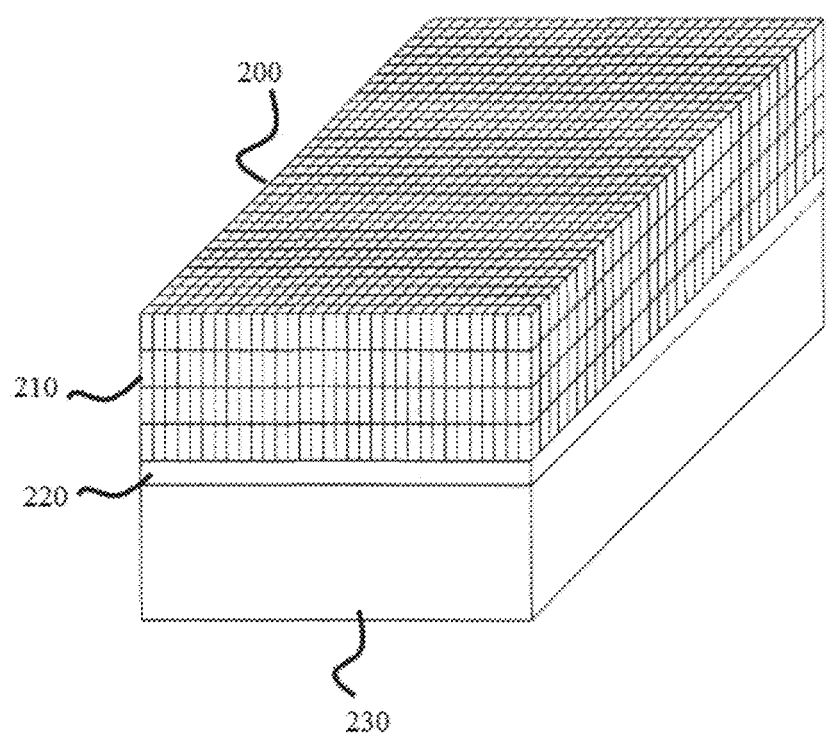
FIG. 2 is a perspective view of a gamma ray detector 200 according to some embodiments of the present disclosure.

FIG. 2 is a perspective view of a radiation ray (e.g., a gamma ray) detector according to some embodiments of the present disclosure. As shown in FIG. 2, the radiation ray detector 200 may include a scintillator block 210, a light guide 220, and a photomultiplier tube 230. The light guide 220 may be optically coupled to the scintillator block 210, and the photomultiplier 230 may be optically coupled to the light guide 220. It should be noted that the radiation ray detector 200 described below is merely provided for illustration purposes, and not intended to limit the scope of the present disclosure. The radiation used herein may include a particle ray, a photon beam, or the like, or any combination thereof. The particle ray may include positron, neutron, proton, electron, μ-meson, heavy ion, or the like, or any combination thereof. The photon beam may include γ-ray, α-ray, β-ray, X-ray, ultraviolet, laser, or the like, or any combination thereof. In some embodiments, the radiation ray detector 200 may include one or more detector blocks. A detector block may include a plurality of detector cells. In the case of a PET system, the detector blocks of the radiation ray detector 200 may be arranged in the form of a ring or a cylinder so that a cross-section of the radiation ray detector 200 may be essentially a closed shape including, for example, a circle, an ellipse, or the like. In the case of a CT system, the detector blocks of the radiation ray detector 200 may be arranged in the form of an arc, a part of a ring, or a part of a cylinder. A detector ring or cylinder, also referred to as a PET ring in a PET case, or a CT ring in a CT case, may include one or more detector blocks. A radiation ray detector 200 may include one or more detector rings. Such a radiation ray detector 200 may surround the subject being tested in the z direction.

In some embodiments, the diameters of the detector rings may be the same. The number of the detector rings may be dependent on the number of detector modules. A detector module may correspond to one or more detector rings. In some embodiments, one or more detector module may be used in the imaging system, either be connected to or be separate from each other. In some embodiments, the detector modules may be arranged in parallel along the z direction of the gantry 101 to form a multi-ring detector in the system. Merely by way of example, in some embodiments, the number of PET rings may range between 16-112. For example, the number of the PET rings may be 24, 36, 44, 52, 96, or 112. In some embodiments, the number of the PET rings may exceed 112.

It should be noted here that paragraphs including, for example, diameters, or shape of the detector rings described above are for illustration purposes, and not intended to limit the scope of the present invention. For instance, the radiation ray detector 200 may include one or more detector blocks that occupy a section of a ring or a cylinder so that a cross-section of the radiation ray detector 200 may be part of a closed shape. Merely by way of example, a pair of detector blocks may be located opposite to each other relative to the z axis (e.g., the center line of the gantry 101). Such a radiation ray detector 200 may be driven to rotate surround the z direction.

The scintillator block 210 may include a plurality of scintillator elements. A scintillator element may convert a radiation ray impinging on the scintillator element into light. In some embodiments, the scintillator element may convert the radiation a ray into light by emitting light itself. The emitted light may further diffuse in the scintillator block 210 and may transmit to the photomultiplier tube 230 through the light guide 220.

The photomultiplier tube 230 may multiply the light transmitted thereto by the light guide 220. The photomultiplier tube 230 may convert the light into an electric signal. In some embodiments, the electric signal may be further sent into the graphics processor 107. In some embodiments, the electric signal may be recognized as an event into the data acquisition circuit 111 (coincidence counting circuit in a PET system) as described above. In some embodiments, only when the light impinging on the scintillator element is detected essentially simultaneously and the line connecting the two scintillators is possibly transmitting through the subject, the impingement may be detected as a true event and may be counted by the data acquisition circuit 111. It should be noted here that the photomultiplier tube 230 is merely provided for illustrating an example of an optical-to-electric signal converter, and not intended to limit the scope of the present disclosure. For example, the optical-to-electric converter may further include a photo-diode, an electrophotonic detector, or the like, or any combination thereof.

In some embodiments, iterative approximation methods may be used to reconstruct image data obtained in the imaging system 100. Exemplary iterative methods may include ML-EM (Maximum Likelihood Expectation Maximization), OSEM (Ordered Subset Expectation Maximization), RAMLA (Row-Action Maximum Likelihood Algorithm), DRAMA (Dynamic Row-Action Maximum Likelihood Algorithm), or the like, or a combination thereof. In some embodiments, iterative approximation methods may include a forward projection operation for obtaining measurement data corresponding to activity of particle emissions, and a back projection operation for obtaining particle emission data. The forward projection operation may include carrying out forward projection calculations of particle emission data corresponding to the object being examined collected by the data acquisition circuit 111. The back projection operation may include carrying out back projection calculations of the measurement data. In some embodiments, the forward projection operations and/or the back projection operations may be computed in parallel by one or more GPUs on one or more computers. For example, the calculations of forward projection corresponding to different subsets of voxels may be calculated in parallel. As another example, the calculations of back projection corresponding to different subsets of voxels may be calculated in parallel. The grouping of voxels may depend on, for example, the radiation direction of a radiation ray (e.g., a LOR or an X ray) passing through the corresponding voxels, the intercept by a radiation ray in a voxel, or the like, or a combination thereof. Details regarding the grouping of voxels and parallel calculations may be found elsewhere in the disclosure. As still another example, the calculations of forward projection or back projection corresponding to different radiation rays may be calculated in parallel.

FIG. 3-A and FIG. 3-B illustrate the geometry of radiation rays according to some embodiments of the present disclosure. As shown in FIG. 3-A, one or more radiation rays may be detected by the detector 200 arranged in the form of a cylinder 301. The radiation rays may be characterized by different parameters. Exemplary parameters may include the rotation angle, the tilting angle, the radial distance, or the like, or a combination thereof.

For illustrative purposes, a radiation ray 303 on a plane 302 is considered. The plane 302 may be in parallel with the z-direction. The rotation angle θ relating to the radiation ray 303 may be an angle formed by the x-direction and the plane 320. In some embodiments, the rotation angle θ may be any value ranging from 0° to 360°. The tilting angle θ relating to the radiation ray 303 may be an angle formed by the radiation ray 303 and the x-y plane. In some embodiments, the value of the tilting angle θ may depend on the dimension of the detector 200. For example, the maximum value of the tilting angle θ may be determined by the height of the cylinder 301 and the dimension of the bottom or the cross-section of the cylinder 301 (e.g., the radius of the bottom or the cross-section of the cylinder 301). The height of the cylinder 301 may correspond to the number of detector rings. In some embodiments, the more rings the cylinder 301 includes, the larger maximum value of the tilting angle may be achieved.

In some embodiments, the number of radiation rays corresponding to a certain value θ may relate to the tilting angle θ. For example, the number of radiation rays corresponding to a tilting angle θ that is closer to 0 may be greater than the number of radiation rays corresponding to a tilting angle θ that is close to the maximum value of the tilting angle θ.

As shown in FIG. 3-B, the radiation ray 303 and 304 are on the plane 302. The tilting angle θ' of the radiation ray 304 is smaller than the tilting angle θ of the radiation ray 303. For illustrative purposes, another radiation ray 304 on the plane 302 corresponding to a smaller tilting angle θ' may be detected in a higher probability than the detection of the radiation ray 303 corresponding to a greater tilting angle.

As illustrated in FIG. 3-B, the radial distance relating to the radiation ray 303 may denote the distance from the original point O to the plane 302. To better illustrate the application, a PET system is described and does not pose a limitation on the scope of the application. The point A may denote the point of annihilation that generates two photons impinging on the detector and forming the LOR 303. The projection of the point A on the x-y plane is A', and the projection of the original point O on the plane 302 is O'. In some embodiments, the position of the point A may be represented by the distance t between A' and O'.

During image reconstruction, the radiation rays may be grouped into different sections based on, for example, the radial distance, the position of the point of annihilation on the LOR, the tilting angle, the rotation angle, or the like, or a combination thereof. In some embodiments, the LORs relating to different rotation angles may be divided into different sections. The iterative reconstruction method (e.g., OSEM, MLEM, DRAMA, etc.) may be conducted in a sequence on the different sections of the LORs. For example, the LORs relating to a certain value of rotation angle may be grouped into one section and may be calculated during one iteration of the reconstruction. During an iteration, the measurement data may be acquired in the measurement from numerous directions and processed by means of an evaluation for image details. In some embodiments according to the present disclosure, the measurement data may be generated by a forward projection. In some embodiments, the forward projection may be conducted based on the particle emission data generated by a back projection of a prior iteration. The prior iteration may be based on a first section of radiation rays corresponding to a certain value of the rotation angle or a range thereof. The back projection of the iteration may be conducted by back projecting the measurement data generated by the forward projection, and may base on a second section of radiation rays corresponding to another certain value of rotation angle θ or a range thereof.

Figure 4:
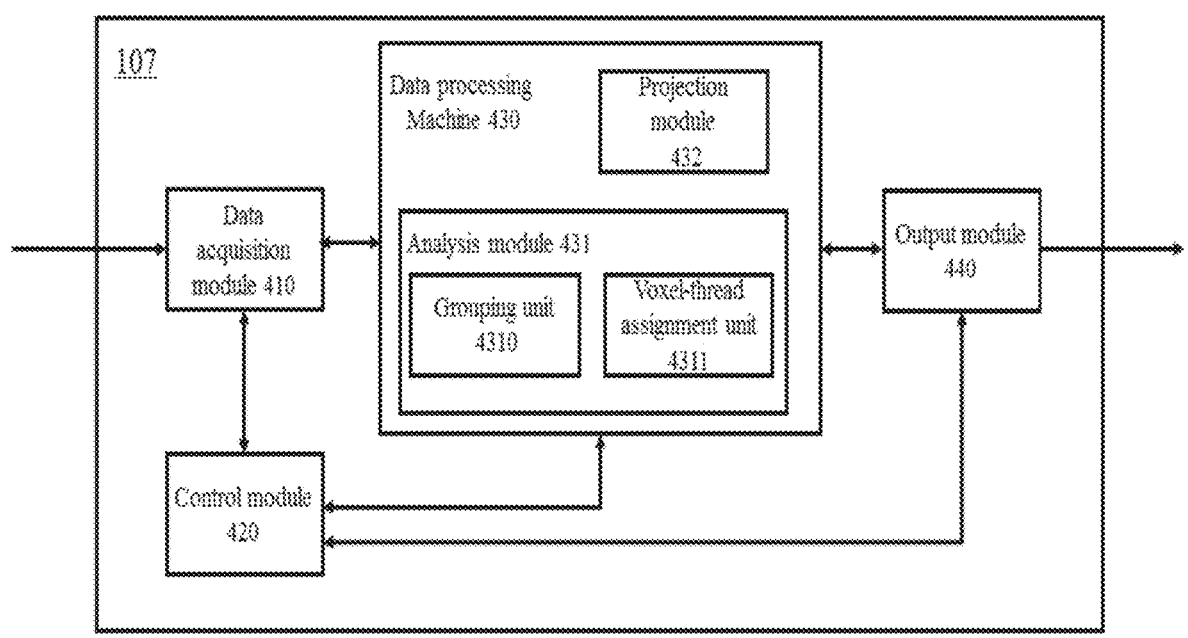
FIG. 4 is a block diagram of a graphics processor 107 according to some embodiments of the present disclosure.

FIG. 4 is a block diagram of a graphics processor 107 according to some embodiments of the present disclosure. As shown in FIG. 4, the graphics processor 107 may include a data acquisition module 410, a control module 420, a data processing machine 430, and an output module 440. The data processing machine 430 may include a projection module 432 and an analysis module 431. The analysis module 431 may include a grouping unit 4310 and a voxel-thread assignment unit 4311. In some embodiments, the control module 420 may control at least one of the grouping unit 4310 and the voxel-thread assignment unit 4311 of the analysis module 331, projection module 432 of the data processing machine 430, the data acquisition module 410, and/or the output module 440. The data processing machine 430 may generate data relating to one or more images (e.g., PET images, or CT images) based on the information received from the data acquisition module 410, the control module 420, or the output module 440, and may further reconstruct the images. In some embodiments, the output module 440, connecting to or communicating with a storage, may transmit feedback to the data processing machine 430. In some embodiments, the feedback sent to the data processing machine 430 may be generated based on the data processed by the data processing machine 430. The data acquisition module 410, the control module 420, the data processing machine 430, and the output module 440 may be connected with each other directly, or with an intermediate unit (not shown in FIG. 4). The intermediate unit may be a visible component or an invisible field (radio, optical, sonic, electromagnetic induction, etc.). The connection between different units/modules may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof.

It should be noted that the above description about the radiation imaging system is merely an example, should not be understood as the only embodiment. To those skilled in the art, after understanding the basic principles of the connection between different units, the units and connection between the units may be modified or varied without departing from the principles. The modifications and variations are still within the scope of the current disclosure described above. In some embodiments, these units/modules may be independent. In some embodiments, part of the units may be integrated into one unit to work together.

The data acquisition module 410 may acquire data from other components in the imaging system 100, e.g., the data acquisition circuit 111, the central processor 105, the GPU memory unit 108, the controller 104, the display 110, etc., directly or indirectly. The acquired data may be transmitted to and be further processed by the data processing machine 430. In some other embodiments, the acquired data may be transmitted to the control module 420 to further control the operation of the data acquisition module 410.

The control module 420 may control the data acquisition module 410, the data processing machine 430, the output module 440, or other units or devices not shown in the system according to some embodiments of the present disclosure. The control module 420 may receive information from and send information to the data acquisition module 410, the data processing machine 430, and/or the output module 440. In some embodiments, the control module 420 may control the operation of the data acquisition module 410. Merely for example, the control module 420 may control whether to acquire data, or the time when the next data acquisition may occur. As another example, the control module 420 may control which section of radiation rays may be processed during an iteration of the reconstruction. The control module 420 may control the data processing machine 430, for example, to select different algorithms to process the raw data of an image, to determine the iteration times of the iteration projection process, and/or the location of the radiation rays. The control module 420 may transmit a command to the output module 440 to display an image. In some embodiments, the control module 420 may receive a real-time or a predetermined command provided by a user including, e.g. an imaging technician, or a doctor. In some embodiments, the control module 420 may receive a command from the computer device. In some embodiments, command by the computer device sends the command when a triggering event occurs.

The data processing machine 430 may process the data transmitted by the data acquisition module 410. The analysis module 431 may analyze the data received by the graphics processor 107. The grouping unit 4310 may group the voxels into a plurality of subsets that may further be calculated in a plurality of parallel processing threads. The voxel-thread assignment unit 4311 may control the mapping of thread with one or more voxels. In some embodiments, one thread may be assigned to one or more voxels. In some embodiments, the voxel-thread assignment unit 4311 may control the decomposition of an algorithm to parallel threads. The projection module 432 may perform forward projection and back projection of the data relating to the image iteratively to generate an optimized image. The forward projection may transform an image (e.g., the particle emission data) to the data domain (e.g., the measurement data). The back projection may transform data in the data domain to data in the image domain. In some embodiments, the number of iterations may be specified by a user or a computer device. In some embodiments, the number of iterations may be determined based on a condition for terminating the iteration. In some embodiments, the projection module 432 may involve an iteration loop that terminates when a condition is deemed satisfied. For instance, the condition may be that the cost or the error between two images obtained in two consecutive iterations is equal to or smaller than a pre-defined value. As another example, the condition may be that the cost or the errors between multiple images (e.g., more than two images) obtained in multiple consecutive iterations (e.g., more than two iterations) are equal to or smaller than a pre-defined value. In some embodiments, the projection module 432 may include a projection kernel (not shown in FIG. 4). The projection kernel may define or weight how much a voxel may contribute to a radiation ray. For example, if a voxel is traversed by a radiation ray, the projection kernel may assign the kernel value of "1" to the voxel; if a voxel is not traversed by the radiation ray, the projection kernel may assign the kernel value "zero" to the voxel. As another example, the contribution of a voxel to a radiation ray may relate to the interception of the voxel by the radiation ray, and the contribution of the voxel to the radiation ray may be taken into account in a forward projection and/or back projection. In some embodiments, the projection kernel may be a CPU projection kernel, a GPU projection kernel, or the like, or any combination thereof.

The output module 440 may output the image generated by the data processing machine 430 to, for example, the display 110 or a storage device. In some embodiments, the output module 440 may send feedback to the data processing machine 430 to control its further operation. Merely by way of example, when the display goes wrong, or the storage to which the output module 440 connects is full, the output module 440 may feed a command back to the data processing machine 430, and the data processing machine 430 may determine whether to terminate the processing of data, or to store the processed data or resulting image in the GPU memory.

Figure 5:
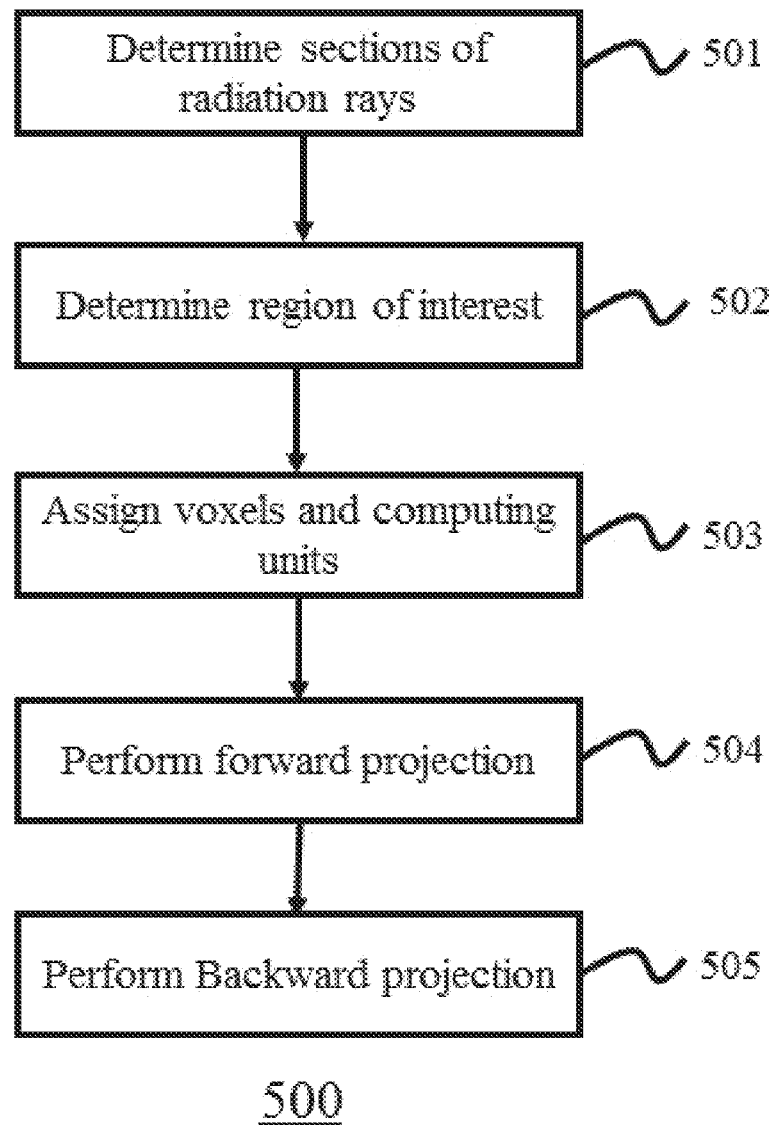
FIG. 5 illustrates an example of a process for image reconstruction according to some embodiments of the present disclosure.

FIG. 5 illustrates an exemplary process 500 for image reconstruction according to some embodiments of the present disclosure. At step 501, different sections of radiation ray may be determined. The process for image reconstruction may be conducted corresponding to the sections of the radiation rays. As described elsewhere in the disclosure, the radiation rays may be grouped based on parameters, such as, the radial distance, the tilting angle, the rotation angle, or the like, or a combination thereof. In some embodiments, in a PET system, the radiation rays (also referred as LORs) may be grouped based on the position of the point of annihilation on the LOR. Merely by way of example, sections of radiation rays may be determined based on the rotation angle of radiation rays. A first section of radiation rays may relate to a first rotation angle, and a second section of radiation rays may relate to a second rotation angle. In some embodiments, the rotation angle of each radiation ray in the first section of radiation rays may be the first rotation angle. In some embodiments, the rotation angle of a radiation ray in the first section of radiation rays may be within an upper limit or a lower limit corresponding to the first rotation angle. In some embodiments, the rotation angle of a radiation ray in the first section of radiation rays may be within a range based on the first rotation angle. As described elsewhere in the disclosure, the image reconstruction may be performed by an iterative reconstruction method. The iterative reconstruction method may be OSEM, MLEM, DRAMA, etc. During an iteration, a forward projection may be conducted, by which measurement data may be generated. The forward projection may be based on the particle emission data generated by a back projection of a prior iteration based on the first section of radiation rays. A back projection of the iteration may be conducted by back projecting the measurement data generated by a forward projection, and may be based on the second section of radiation rays.

At step 502, the region of interest may be determined. The sections of radiation rays passing through the region of interest may be calculated during the image reconstruction. In some embodiments, the region of interest may be determined by a default setting provided by, for example, a user or the imaging system 100. For example, a region of an image generated by a back projection during an iteration may be determined by a user including, for example, a physician, a doctor, etc. In some embodiments, the region of interest may be determined based on the particle emission data. For example, a region with high intensity of particle emission may be determined as a region of interest. Moreover, a region with an intensity of particle emission exceeding a threshold may be determined as a region of interest.

At step 503, the method 500 may be performed by assigning voxels and threads based on a radiation ray that may pass through a region of interest. In some embodiments, the voxels passed by the radiation ray may be grouped into different subsets based on, for example, the radial distance of the radiation ray, the tilting angle of the radiation ray, the rotation angle of the radiation ray, or the like, or a combination thereof. In some embodiments, in a PET system, the voxels passed by the LOR may be grouped into different subsets based on the position of the point of annihilation on the LOR. A subset of voxels may be calculated by at least one processing unit (e.g., a thread) in the graphics process 107. As described in FIG. 4, the subsets of voxels may be determined by the grouping unit 4310, and the assignment of processing units may be performed by the voxel-thread assignment unit 4331. In some embodiments, the processing units (e.g., threads) assigned to calculate different subsets of voxels relating to a radiation ray may be neighboring in a same processor. In some embodiments, a processing unit (e.g., a thread) assigned to calculating a subset of voxels may correspond to the location of the subset of voxels stored in a memory (e.g., the global memory). Details regarding the grouping of voxels and the assignment of processing units corresponding to different subsets of voxels will be described in FIG. 6, FIG. 7, and FIG. 8.

At step 504, a forward projection may be performed. The forward projection may obtain measurement data by carrying out forward projection calculations based on particle emission data corresponding to the object collected by the data acquisition circuit 111. At step 505, a back projection may be performed. The back projection may obtain particle emission data by carrying out back projection calculations based on the measurement data. In some embodiments, the forward projection and/or back projection may be performed based on the assignment of processing units to the subsets of voxels.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, the determination of a region of interest may be performed prior to the determination of sections of radiation rays. Further, the determination of sections of radiation rays may base on the regions of interest determined. As another example, the determination of a region of interest may be unnecessary. In some embodiments, the assignment of processing units in a forward projection may be different from the assignment of processing units in a back projection. For example, a processing unit may be assigned to calculating different subsets in a forward projection and in back projection. In some embodiments, the subsets of voxels may be divided in different manners during different iterations. For example, the voxels may be grouped in a first manner in a first iteration; the voxels may be grouped in a second manner in a second iteration. The first manner may be different from the second manner. In some embodiments, the assignment of a processing units in one iteration may be different from the assignment of the processing units in another iteration.

Figure 6:
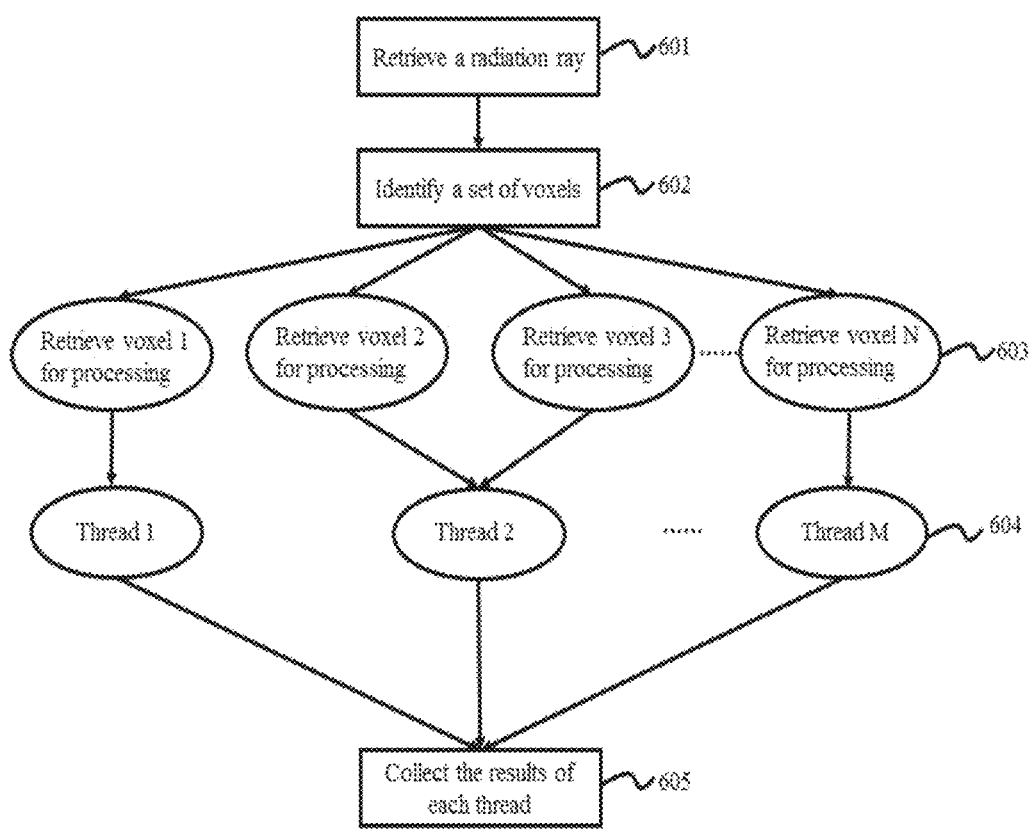
FIG. 6 shows a division architecture according to some embodiments of the present disclosure.

FIG. 6 shows a division architecture according to some embodiments of the present disclosure. At step 601, a radiation ray may be retrieved. Voxels passed through by the radiation ray may be identified at step 602. During the identification, the interception of the voxels by the radiation ray may be acquired. In some embodiments, the intercept may correspond to the particle emission data. For example, a larger intercept across a voxel may reflect a higher intensity of particle emission in the voxel. The assignment of threads corresponding to voxels as described in FIG. 5 may relate to the interception of the voxels by the radiation ray. Details regarding the assignment may be found in FIG. 7 and the description thereof.

At step 603, voxels may be divided into different subsets. In some embodiments, one subset may correspond to one voxel. In some embodiments, one subset may correspond to two or more voxels. As shown in FIG. 6, voxel 1 may form a first subset for subsequent processing, voxel 2 and voxel 3 may form a second subset for subsequent processing. When the voxels which a radiation ray passes are grouped, different subsets of voxels may be assigned different threads during a forward projection and/or a back projection. As shown in FIG. 6, the first subset of voxels (e.g., voxel 1) may be calculated by thread 1; the second subset of voxels (e.g., voxel 2 and voxel 3), may be calculated by thread 2. The threads may be controlled by a GPU software kernel (e.g., included in the graphics processor 107). Calculations performed by the threads may be performed in parallel or at least partially in parallel. The threads may be synchronized by the control module 420 during the calculation of the radiation ray.

At step 605, the results calculated by the threads may be collected for subsequent processing. In some embodiments, the subsequent processing may include calculating the measurement data in a forward projection or calculating the particle emission data in a back projection. In some embodiments, the subsequent processing may include calculating a cost function relating to the measurement data and/or the particle emission data acquired during an iteration and its prior iteration step.

Figure 7:
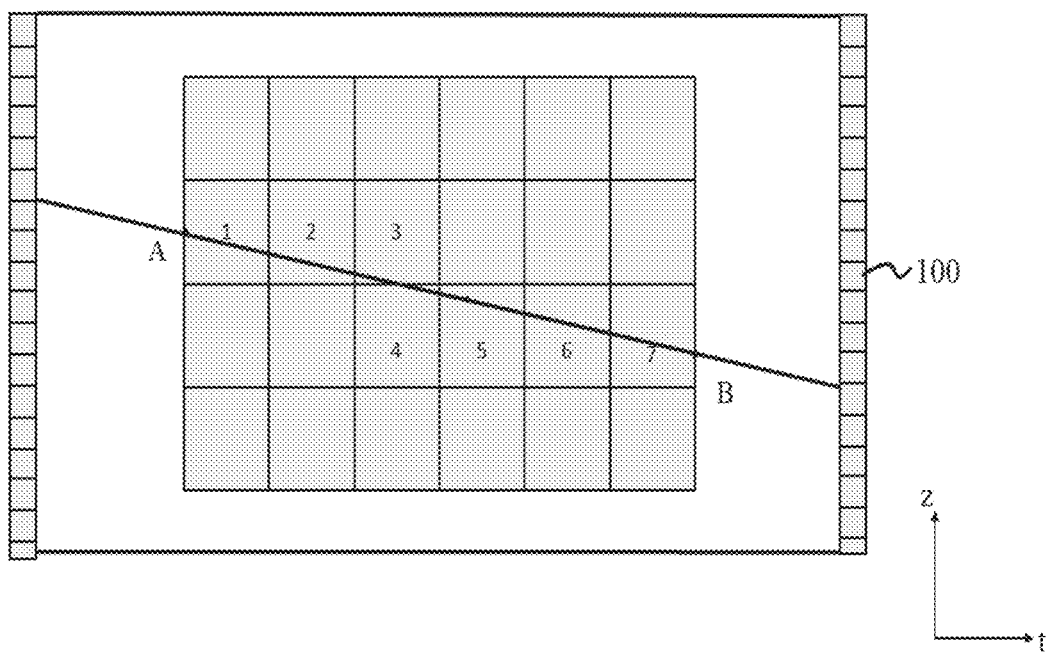
FIG. 7 shows a schematic view showing a LOR passing through voxels according to some embodiments of the disclosure.

FIG. 7 shows a schematic view showing a radiation ray passing through voxels according to some embodiments of the disclosure. First, a point serving as the starting point of the radiation ray and a point serving as the terminal point of the radiation ray may be determined. The coordinate of the starting point A and the terminal point B may be determined by the LOR and the boundary of the image to be reconstructed. Without losing generality, assume the image is formed by $N_s*N_t*N_z$ voxels, and the size of a voxel is $p_s*p_t*p_z$ in the case when the voxel is a cuboid.

For illustrative purpose, the z-t plane as shown in FIG. 3-A and FIG. 3-B (also referred as the plane 302) is described based on the sections determined in step 501 of FIG. 5. Because the sections are in the z-t planes, the coordinates, and similarly the coordinates on the section specifying the starting point A, as shown in FIG. 7, may be (t, z) coordinates; the coordinates on the section specifying the terminal point B may be (t, z) coordinates. The coordinates of the starting point A may be expressed as $(t_s, z_s)$, and the coordinates of the terminal point B may be expressed as $(t_e, z_e)$. In some embodiments, the number of voxels that a certain radiation ray passes may be determined by the tilting angle θ of the radiation ray. Merely by way of example, in a ring-type PET/CT system, the radiation ray may pass $N_t$ voxels when the tilting angle θ is 0. In some embodiments, a larger tilting angle θ of a radiation ray may correspond to more voxels that the radiation ray passes. For instance, the maximum number of voxels that a radiation ray passes may be expressed as $$\left(\left[\frac{p_t \times \tan\beta}{p_z}\right] + 2\right) \times N_t, \quad (1)$$

corresponding to the maximum tilting angle β that a radiation ray may achieve. As described in FIG. 3-A and FIG. 3-B, the maximum tilting angle β may be determined by the diameter of the ring $L_d$ and the axial length (or referred as "height") $L_z$. More specifically, β may equal $$\frac{L_z}{L_d}.$$

Referring back to FIG. 7, the t coordinate of the voxels which the radiation ray passes may be expressed as $$t_s + n \times dt, \qquad (2)$$

where $0 \leq n \leq N_t - 1$, dt may denote a unit step size along the t direction. For illustrative purposes, assume that the maximum tilting angle $\beta$ is no more than 45°, the radiation ray may pass no less than $N_t$ voxels and may pass no more than $2N_t$ voxels.

As shown in FIG. 7, the voxels passed by the radiation ray are labeled with 1, 2, 3, . . . , 7. The voxel 1 may correspond to a t value of $t_s$. The voxel 2 may correspond to a t value of $t_s + dt$. The voxel 3 and the voxel 4 may correspond to a same t value of $t_s + 2 \times dt$. In some embodiments, the voxels that the radiation ray passes may be grouped based on their t values. For example, the voxel 1 may form a first subset, and the voxel 2 may form a second subset. The voxel 3 and the voxel 4 may form a third subset. As described elsewhere in the disclosure, different subsets of voxels may be assigned different threads to calculate the intercepts crossed by the radiation ray and the voxels. A first thread may be used to calculate the intercept on the voxel 1 by the radiation ray; a second thread may be used to calculate the intercept on the voxel 2 by the radiation ray; a third thread may be used to calculate the intercept on the combination of the voxel 3 and the voxel 4 by the radiation ray.

It shall be noted that the amount of voxels in a subset may depend on the structure of the imaging system 100 (e.g., the axial length). For example, in the case where the maximum tilting angle $\beta$ is more than 45°, the number of voxels in one subset may be no more than $$\left( \left[ \frac{p_t \times \tan\beta}{p_z} \right] + 2 \right). \qquad (3)$$

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, grouping of voxels may base on a range of t coordinate, and voxels with their t coordinates falling into the range may be grouped into a same subset. As another example, one subset of voxels may be assigned more than one thread in calculation based on the voxels included in the specific subset.

In some embodiments, the first thread, the second thread, and the third thread may be next to each other in a same scalar processor. In some embodiments, the voxels of the image may be stored or buffered in a memory in a specific order. For example, the voxels may be stored or buffered in the following way: firstly, the voxels from a first row along the t direction may be stored or buffered sequentially in a memory; secondly, the voxels from a second row next to the first row may be stored or buffered sequentially in the same memory; thirdly, the voxels belonging to a next section may be stored or buffered after the voxels relating to a section are stored or buffered.

As shown in FIG. 7, voxel 1, voxel 2, and voxel 3 may be stored or buffered sequentially in a memory prior to the storing or buffering of voxel 4, voxel 5, voxel 6, and voxel 7 that may also be stored or buffered in the same memory. Therefore, neighboring voxels may be accessed by neighboring threads in calculating the intercepts by the radiation ray. For instance, the neighboring voxels 1 and 2 stored or buffered in a memory may be accessed by the first thread and the second thread that may be located next to each other in a GPU. The memory mentioned herein may be the GPU memory unit 108 in the form of, for example, a global memory, a shared memory, a register, or the like, or a combination thereof. Details regarding the memory may be described in FIG. 9.

Figure 8:
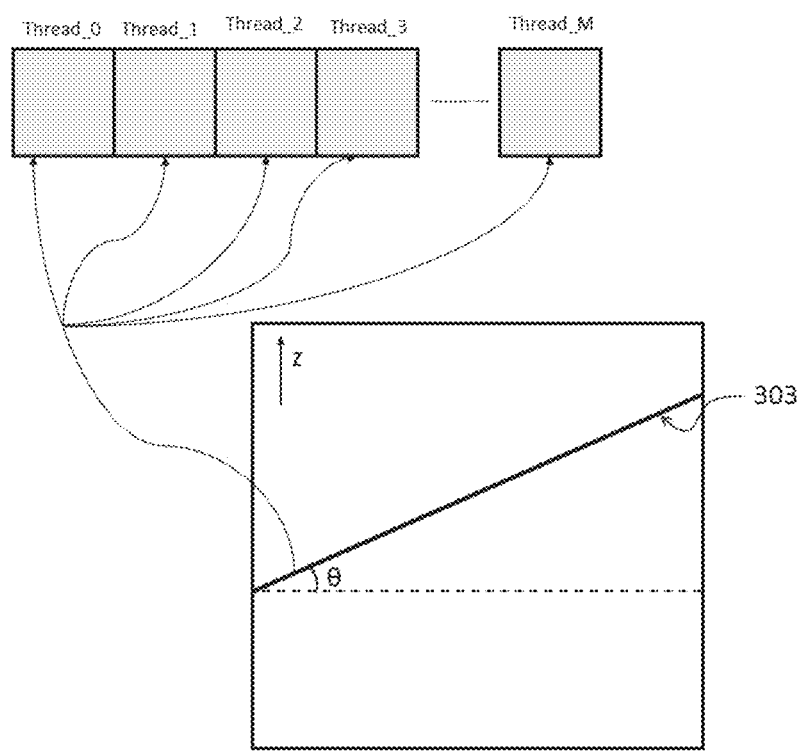
FIG. 8 shows a schematic view illustrating parallel calculations for LORs according to some embodiments of the present disclosure.

FIG. 8 shows a schematic view illustrating parallel calculations for radiation rays according to some embodiments of the present disclosure. As shown in FIG. 8, "Thread_0," "Thread_1," "Thread_2," "Thread_3," . . . and "Thread_M" may be processing units of parallel calculation on the voxels the radiation ray 303 passes. For example, the "Thread_0" may be used to calculate the intercepts relating to a subset of voxels the radiation ray 303 passes. The "Thread_1" may be used to calculate the intercepts relating to another subset of voxels the radiation ray 303 passes. In some embodiments, the "Thread_0" and "Thread_1" may be located next to each other in a same thread block of a scalar processor in a GPU device. In some embodiments, the subset of voxels calculated by the "Thread_0" may be stored or buffered in a memory next to the subset of voxels calculated by the "Thread_1."

Figure 9:
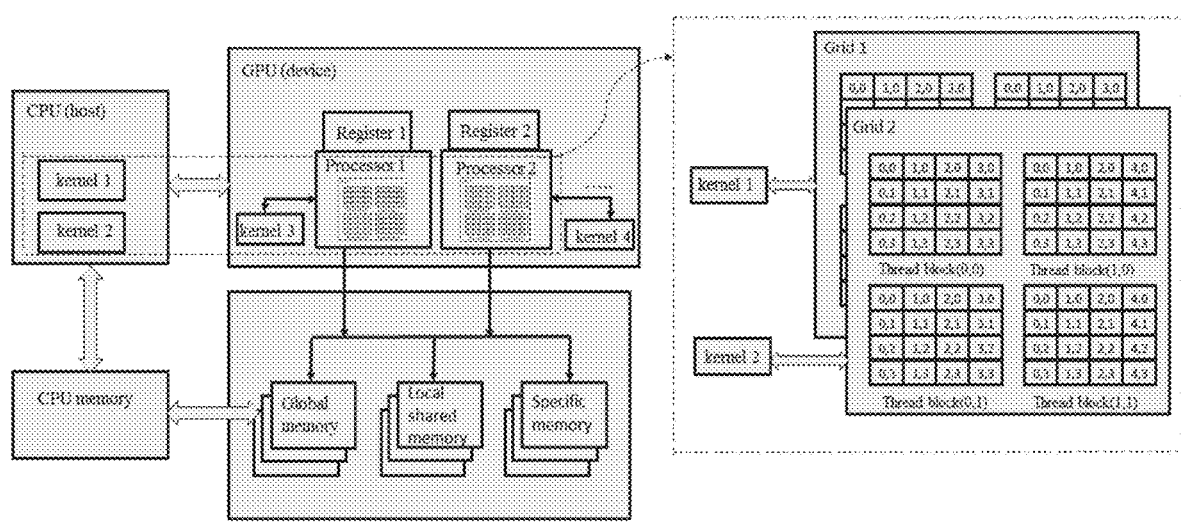
FIG. 9 shows a schematic of the data passing between the CPU and the GPU with parallel processing architecture according to some embodiments of the present disclosure.

FIG. 9 shows a schematic of the data passing between the CPU and the GPU with a parallel processing architecture. As shown in FIG. 9, the central processing unit (CPU) may be connected to or communicate with the graphic processing unit (GPU). The CPU may communicate with a CPU memory to retrieve instructions or data for processing. The GPU may include a scalar processor that may communicate with a GPU memory. Exemplary GPU memory may include a Global memory, a local shared memory, a specific memory, or the like, or a combination thereof. Data for image reconstruction in a PET system may be transferred between the CPU memory and the GPU memory. It shall be noted that other storage device (e.g., the secondary storage 109, not shown in FIG. 9) may be applied for storing, for example, the processing results by the GPU processors. In some embodiments, the GPU may include multiple scalar processors and registers, making parallel processing of data relating to voxels more efficient in GPU than the CPU.

The parallel processing architecture employing the parallel algorithm according to the present disclosure is shown in the enlarged figure surrounded by the line of dashes. As shown, a thread may be the smallest processing unit in the processor. A plurality of threads may be distributed into a block (e.g., thread block (0, 0), thread block (1, 0), thread block (0, 1), thread block (1, 1), etc.), and a plurality of blocks may form a grid (e.g., grid 1, grid 2, etc.). In some embodiments, the threads in a thread block executed by the GPU may be allocated to a single processor such that the threads may have the same control path. The assignment of threads may be conducted based on the blocks and grids where the threads may locate. For example, neighboring threads in a block may be designed to access neighboring data elements stored or buffered in, for example, the global memory. The assignment of threads for different subsets of voxels may be controlled by a CPU kernel (e.g., the kernel 1), and/or a GPU software kernel (not shown). In some embodiments, each thread in the block may carry out independent instructions. For example, the calculations of a subset of voxels in the image may be carried out by a thread with instructions different from other threads.

As described elsewhere in the disclosure, a radiation ray may be assigned one or more threads. As shown in FIG. 8, for example, the radiation ray 303 may be processed by the combination of "Thread-0," "Thread-1," "Thread-2," . . . and "Thread-M," which may be located next to each other in a same block. Each of these threads may be coupled with and configured to read (write to) a subset of voxels. For instance, "thread-1" may be configured to read (write to) voxel 1, and "Thread-2" may be configured to read (write to) voxel 2 and voxel 3.

The GPU memory may include a global memory, a local shared memory, a specific memory, or the like, or a combination thereof. A specific memory may be configured to store the local data of a thread. In some embodiments, the specific memory is not accessible to other threads. The local shared memory may be configured to store the data of thread in a block. In some embodiments, the local shared memory may be visited by a set or all of the threads in the same block. In some embodiments, the local shared memory may act as a managed cache for the global memory. The global memory may be configured or used as a common storage for all data blocks in the grid, and may be accessible to all the processors of the parallel processing architecture. In some embodiments, data relating to voxels in the image may be stored or buffered in the global memory or in the local shared memory by a specific order. For example, as shown in FIG. 7, voxels in a row along the t direction may be stored or buffered sequentially in the global memory.

In some embodiments, the global memory may be organized in a hierarchical way to accelerate memory access. Merely by way of example, given that different sections of radiation rays the may be processed sequentially based on the rotation angle, the global memory may be configured to store the voxels passed by a section of radiation rays sequentially. As another example, the voxels passed by a same radiation ray may be stored in the global memory sequentially.

It should be noted here that while the global memory is shown to be embodied on an integrated circuit that is separate from the integrated circuit on which the processors of the aforementioned parallel processing architecture are embodied, in some embodiments, the global memory and the processors may be embodied on the same integrated circuit, as desired.

The CPU kernel (e.g., kernel 1, kernel 2, etc.) or the GPU kernel (e.g., kernel 3, kernel 4, etc.), as illustrated in FIG. 9, may be coupled to the GPU processors and may be configured or used to define or assess how much a voxel may contribute to a radiation ray. Merely by way of example, if a voxel is traversed by the radiation ray, the kernel may assign a voxel value of "1" to the voxel; if a voxel is not traversed by the radiation ray, the kernel may assign a voxel value of "zero" to the voxel. In some embodiments, voxel values provided by the kernel may be computed locally and accumulated within a register located in the GPU. In some embodiments, the kernel value may be predetermined before the iteration process and may be stored in the CPU or GPU. In some other embodiments, the kernel value may be computed on-the-fly on the GPU. In some embodiments, the kernel value may depend on the intercept caused by the radiation ray passing through a voxel. Merely by way of example, a longer intercept across a voxel may relate to a larger kernel value. The contribution of a voxel to a radiation ray may be weighed based on the intercept by the radiation ray. In some embodiments, the CPU kernel(s) and the GPU kernel(s) may be projection kernels in the Projection module 432.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, the CPU kernel(s) and the GPU kernel(s) may be a single kernel that is shared by the CPU and the GPU.

In some embodiments, a tangible and non-transitory machine-readable medium or media having instructions recorded thereon for a processor or computer to operate an imaging apparatus to perform one or more functions of the modules or units described elsewhere herein, for example, to implement the processes of grouping voxels, or assigning threads to calculate data relating to certain voxels, may be provided. The medium or media may be any type of CD-ROM, DVD, floppy disk, hard disk, optical disk, flash RAM drive, or other type of computer-readable medium or a combination thereof.

The various embodiments and/or components, for example, the modules, units, processors, components and controllers (e.g., controller 104), may be implemented as part of one or more computers or processors. The computer or processor may include a computing device, an input device, a display unit and an interface, for example, for accessing the Internet or communicating with a cloud server. The computer or processor may include a microprocessor. The microprocessor may be connected to a communication bus. The computer or processor may also include a memory. The memory may include Random Access Memory (RAM) and Read Only Memory (ROM). The computer or processor further may include a storage device including, for example, a hard disk drive or a removable storage drive such as a floppy disk drive, optical disk drive, or the like, or a combination thereof. The storage device may also be other similar means for loading computer programs or other instructions into the computer or processor. The computer or processor executes a set of instructions that are stored in one or more storage elements, in order to process input data. The storage elements may also store data or other information as desired or needed. The storage element may be in the form of an information source or a physical memory element within a processing machine.

It should be noted that the above description is merely provided for the purposes of illustration, and not intended to limit the scope of the present disclosure. For persons having ordinary skills in the art, multiple variations and modifications may be made under the teachings of the present disclosure. For example, the non-Cartesian sampling disclosed in this disclosure may combine with techniques including parallel imaging, compressed sensing, partial Fourier transformation, or the like, or any combination thereof. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

We claim:

1. A method comprising:
obtaining raw data corresponding to radiation rays within a volume, the radiation rays taking the form of a line of response (LOR);
determining, among the radiation rays, a first radiation ray passing a plurality of voxels corresponding to a portion of the volume based on the raw data;
grouping the plurality of voxels corresponding to the portion of the volume which are passed by the first radiation ray into a plurality of subsets based on at least one of a radial distance, a position of the point of annihilation on the LOR, a tilting angle, or a rotation angle, at least a portion of the plurality of subsets of voxels being sequentially loaded into a memory; and
performing at least one iteration of calculation relating to the sequentially loaded subsets of voxels by a plurality of processing threads in a parallel hardware architecture to generate an image of the volume, wherein each of the at least one iteration of calculation includes performing a forward projection or a back projection for at least some of the sequentially loaded subsets in parallel.

2. The method of claim 1, wherein the parallel hardware architecture includes at least one graphic processing unit, and the at least one graphic processing unit comprising a plurality of scalar processors.

3. The method of claim 1, wherein the at least a portion of the plurality of subsets of voxels having identical control paths.

4. The method of claim 1, wherein the memory is a graphics processing unit (GPU) memory.

5. The method of claim 1, wherein the number of voxels in a subset of the plurality of subsets depends on the tilting angle.

6. The method of claim 1, wherein
each of the plurality of processing threads is assigned to one of the loaded subsets of voxels in each of the at least one iteration of calculation.

7. The method of claim 1, wherein the at least one iteration includes an $M_{th}$ iteration, and an $N_{th}$ iteration, wherein
an assignment of the processing threads to the loaded subsets of voxels in the $M_{th}$ iteration is different from an assignment of the processing threads to the loaded subsets of voxels in the $N_{th}$ iteration.

8. The method of claim 1, wherein at least one of the plurality of processing threads is assigned to two different subsets of voxels in a forward projection and a back projection, respectively.

9. The method of claim 1, wherein the plurality of processing threads are synchronized in each of the at least one iteration of calculation relating to the sequentially loaded subsets of voxels.

10. The method of claim 1, wherein the first radiation ray is on a second plane, the second plane being perpendicular to a first plane which is a x-y plane.

11. A system, comprising:
at least one storage medium including a set of instructions; and
at least one processor configured to communicate with the at least one storage medium, wherein when executing the set of instructions, the at least one processor is configured to direct the system to perform operations including:
obtaining raw data corresponding to radiation rays within a volume, the radiation rays taking the form of line of response (LOR);
determining, among the radiation rays, a first radiation ray passing a plurality of voxels corresponding to a portion of the volume based on the raw data;
grouping the plurality of voxels corresponding to the portion of the volume which are passed by the first radiation ray into a plurality of subsets based on at least one of a radial distance, a position of the point of annihilation on the LOR, a tilting angle, or a rotation angle, at least a portion of the plurality of subsets of voxels being sequentially loaded into a memory; and
performing at least one iteration of calculation relating to the sequentially loaded subsets of voxels by a plurality of processing threads in a parallel hardware architecture to generate an image of the volume, wherein each of the at least one iteration of calculation includes performing a forward projection or a back projection for at least some of the sequentially loaded subsets in parallel.

12. The system of claim 11, wherein the parallel hardware architecture includes at least one graphic processing unit, and the at least one graphic processing unit comprising a plurality of scalar processors.

13. The system of claim 11, wherein the at least a portion of the plurality of subsets of voxels having identical control paths.

14. The system of claim 11, wherein the memory is a graphics processing unit (GPU) memory.

15. The system of claim 11, wherein
each of the plurality of processing threads is assigned to one of the loaded subsets of voxels in each of the at least one iteration of calculation.

16. The system of claim 11, wherein the at least one iteration includes an $M_{th}$ iteration, and an $N_{th}$ iteration, wherein
an assignment of the processing threads to the loaded subsets of voxels in the $M_{th}$ iteration is different from an assignment of the processing threads to the loaded subsets of voxels in the $N_{th}$ iteration.

17. The system of claim 11, wherein at least one of the plurality of processing threads is assigned to two different subsets of voxels in a forward projection and a back projection, respectively.

18. The system of claim 11, wherein the plurality of processing threads are synchronized in each of the at least one iteration of calculation relating to the sequentially loaded subsets of voxels.

19. The system of claim 11, wherein the first radiation ray is on a second plane, the second plane being perpendicular to a first plane which is a x-y plane.

20. A non-transitory computer readable medium, comprising at least one set of instructions, wherein when executed by at least one processor of an electronic terminal, the at least one set of instructions directs the at least one processor to perform acts of:
obtaining raw data corresponding to radiation rays within a volume, the radiation rays taking the form of line of response (LOR);
determining, among the radiation rays, a first radiation ray passing a plurality of voxels corresponding to a portion of the volume based on the raw data;
grouping the plurality of voxels corresponding to the portion of the volume which are passed by the first radiation ray into a plurality of subsets based on at least one of a radial distance, a position of the point of annihilation on the LOR, a tilting angle, or a rotation angle, at least a portion of the plurality of subsets of voxels being sequentially loaded into a memory; and
performing at least one iteration of calculation relating to the sequentially loaded subsets of voxels by a plurality of processing threads in a parallel hardware architecture to generate an image of the volume, wherein each of the at least one iteration of calculation includes performing a forward projection or a back projection for at least some of the sequentially loaded subsets in parallel.

* * * * *